United States Patent [19]

Girard et al.

[11] Patent Number: 4,466,058
[45] Date of Patent: Aug. 14, 1984

[54] METHOD AND APPARATUS FOR ESTABLISHING PRIORITY BETWEEN PROCESSING UNITS HAVING A COMMON COMMUNICATION CHANNEL

[75] Inventors: Donald J. Girard; Robert R. O'Dell; Albert J. Chanasyk; William M. Belknap, all of Cambridge, Ohio

[73] Assignee: NCR Corporation, Dayton, Ohio

[21] Appl. No.: 308,744

[22] Filed: Oct. 2, 1981

[51] Int. Cl.³ .............................. G06F 3/00; G06F 9/46
[52] U.S. Cl. .................................................. 364/200
[58] Field of Search .............................. 364/200, 900

[56] References Cited

U.S. PATENT DOCUMENTS

| | | | |
|---|---|---|---|
| 3,710,324 | 1/1973 | Cohen et al. | 364/200 |
| 3,983,540 | 9/1976 | Keller et al. | 364/200 |
| 3,996,561 | 12/1976 | Kowal et al. | 364/200 |
| 4,059,851 | 11/1977 | Nutter et al. | 364/200 |
| 4,096,572 | 6/1978 | Namimoto | 364/200 |
| 4,121,285 | 10/1978 | Chen | 364/900 |
| 4,151,592 | 4/1979 | Suzuki et al. | 364/200 |
| 4,151,598 | 4/1979 | Webster | 364/900 |
| 4,153,934 | 5/1979 | Sato | 364/200 |
| 4,181,933 | 1/1980 | Benysek | 364/200 |
| 4,181,941 | 1/1980 | Godsey | 364/200 |
| 4,320,457 | 3/1982 | Tanikawa | 364/200 |
| 4,359,731 | 11/1982 | Beauford et al. | 364/200 |

Primary Examiner—Jerry Smith
Assistant Examiner—Jameson Lee
Attorney, Agent, or Firm—J. T. Cavender; Wilbert Hawk, Jr.; Richard W. Lavin

[57] ABSTRACT

A system for controlling the flow of data over a common bus between a plurality of processing units is disclosed which preferably includes a MOS/LSI circuit controller chip associated with each processing unit for awarding priority of access to the common bus when two or more processing units attempt to simultaneously gain access to the common bus. A contention circuit located in each controller chip is responsive to the sensing of each bit in the address of its associated processing unit, and generates a plurality of transitions on the common bus during the time a binary one bit is sensed in the address and listens for the presence of any transition on the common bus during the time a binary zero is sensed in the address. Access to the common bus is lost when transitions are detected on the bus during the time a binary zero bit is sensed and acquired when no transitions have been detected at the completion of the sensing of the address of the requesting processing unit.

18 Claims, 19 Drawing Figures

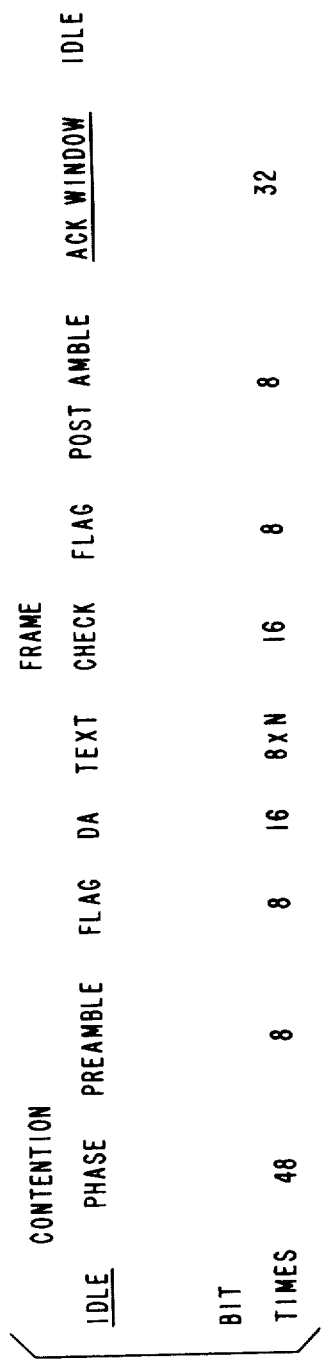
FIG. 2
FIG. 3

FIG. 4

| | 1 | 1 | 0 | 1 | |
|---|---|---|---|---|---|
| 1101 | NOISY | NOISY | QUIET | NOISY | BEGINS MESSAGE FRAME |
| | NOT LISTENING | NOT LISTENING | ALL QUIET | NOT LISTENING | |
| | CONTINUES | CONTINUES | CONTINUES | CONTINUES | |

| | 1 | 1 | 0 | 0 |
|---|---|---|---|---|
| 1100 | NOISY | NOISY | QUIET | QUIET |
| | NOT LISTENING | NOT LISTENING | ALL QUIET | HEARS NOISE |
| | CONTINUES | CONTINUES | CONTINUES | DROPS OUT |

| | 1 | 0 |
|---|---|---|
| 1011 | NOISY | QUIET |
| | NOT LISTENING | HEARS NOISE |
| | CONTINUES | DROPS OUT |

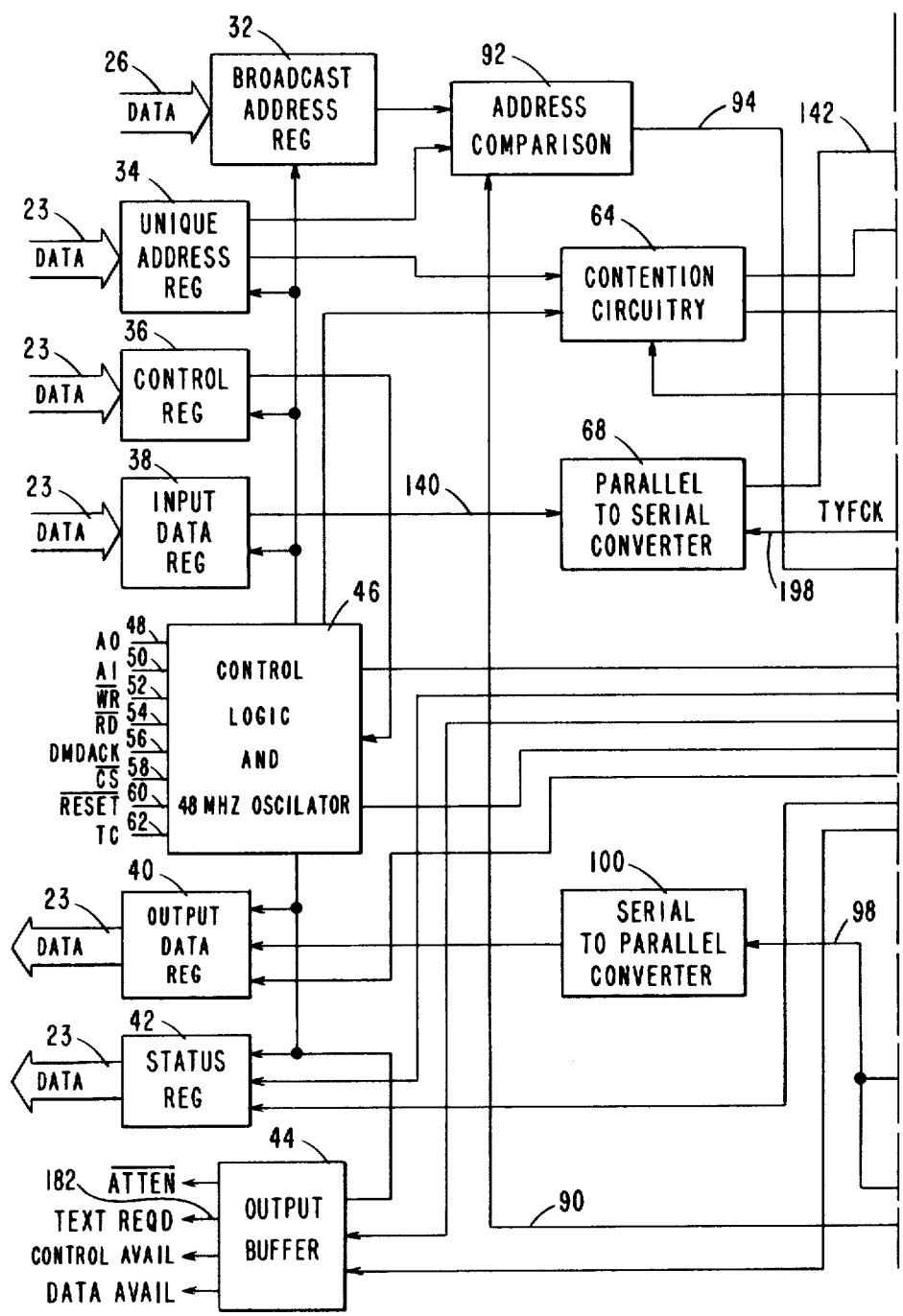

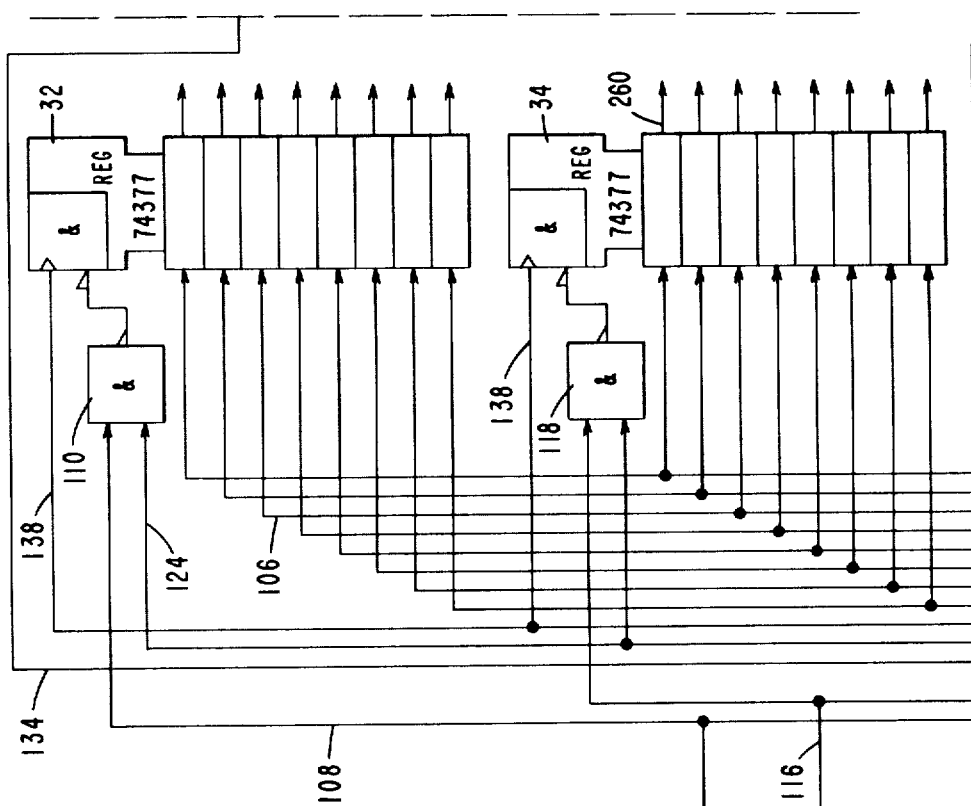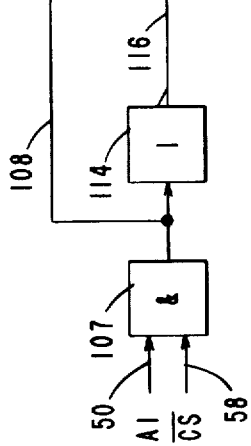

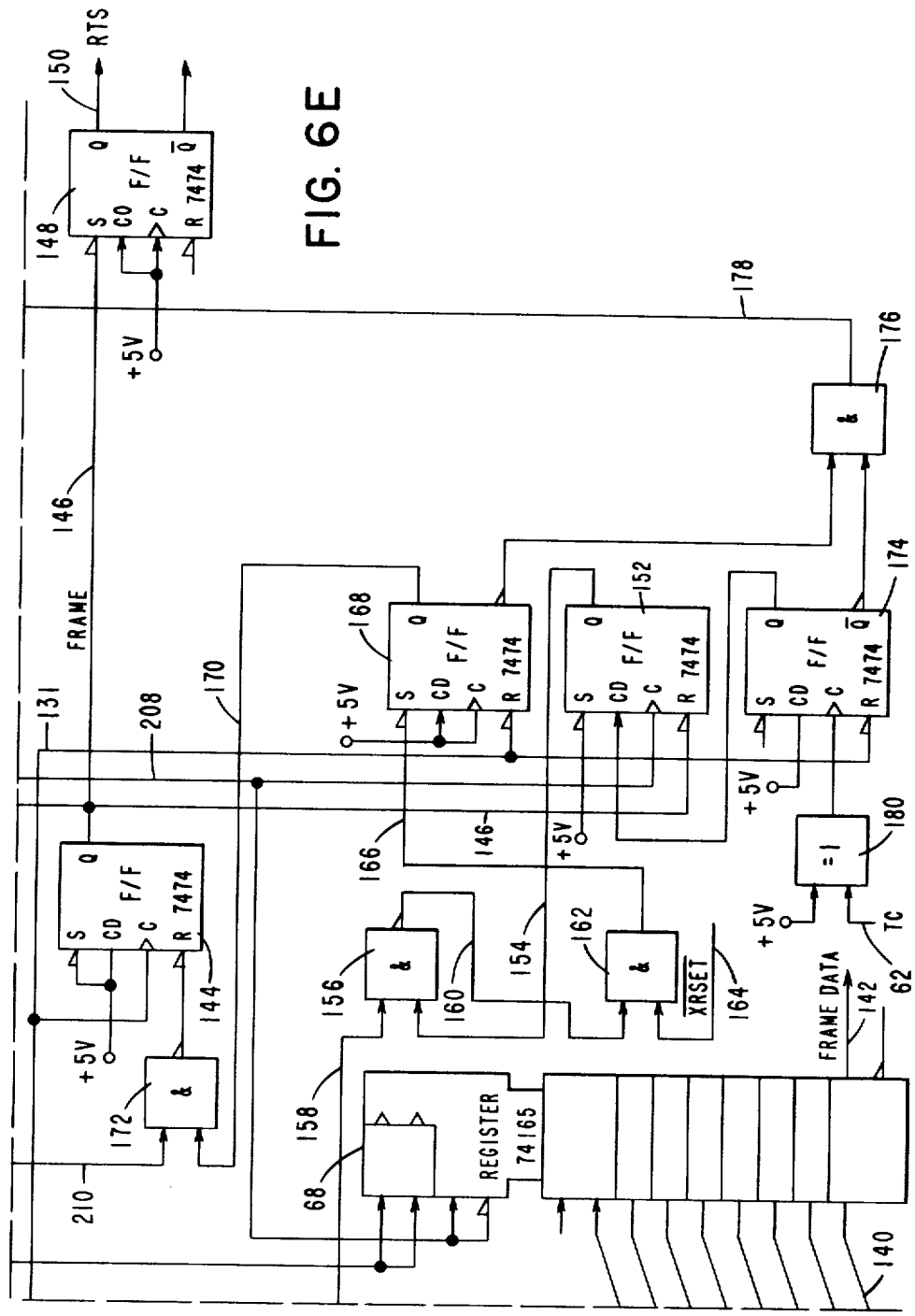

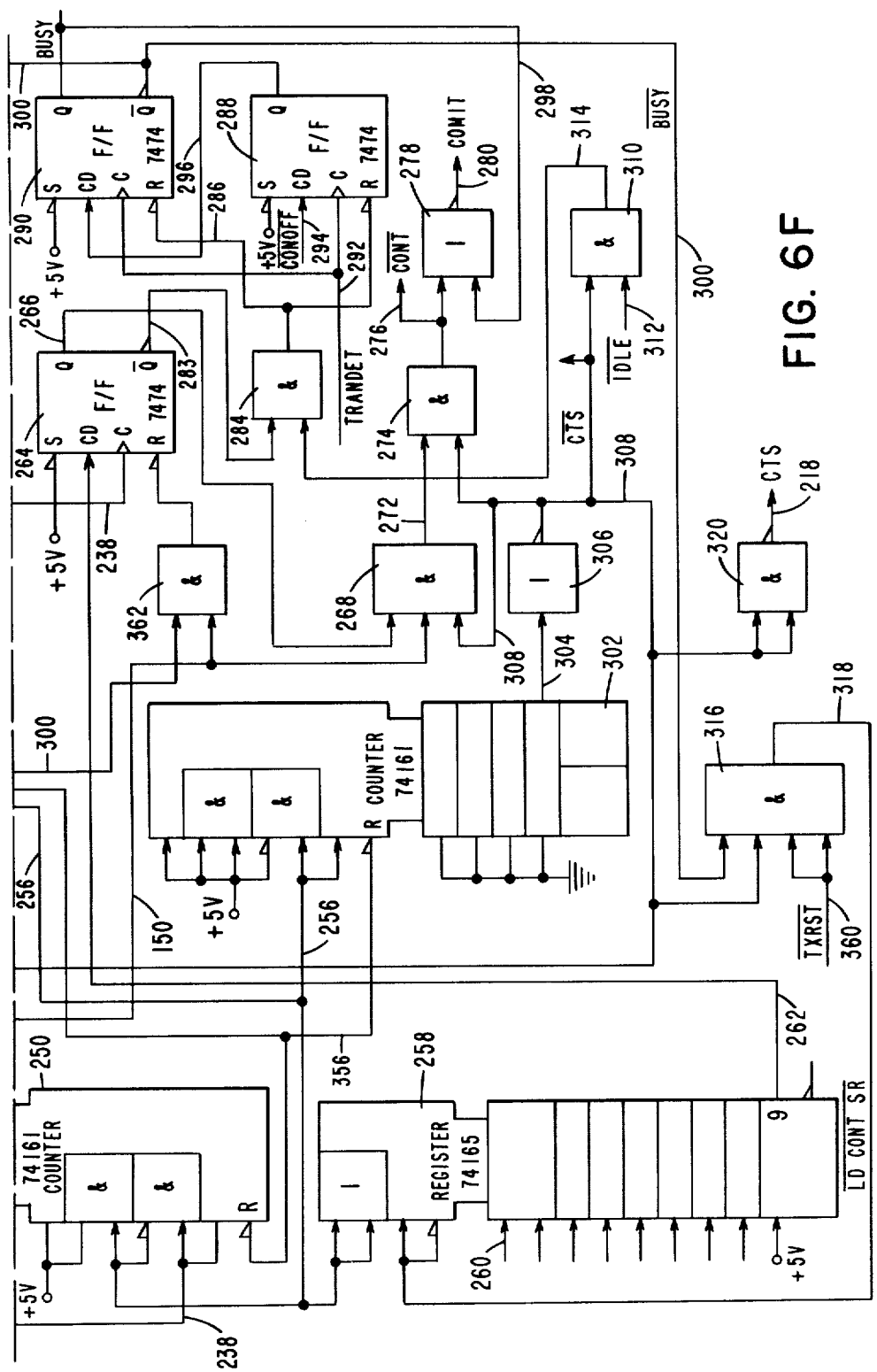

METHOD AND APPARATUS FOR ESTABLISHING PRIORITY BETWEEN PROCESSING UNITS HAVING A COMMON COMMUNICATION CHANNEL

BACKGROUND OF THE INVENTION

The present invention is directed to a system for transmitting data between a plurality of data processing units and more particularly to a communications controller which includes a contention circuit to award priority of access to a communications channel among a plurality of requesting processing units.

In data processing systems in which a central processing unit is connected over a common communication channel to a plurality of peripheral devices, access to the channel is given to the first processing unit requesting access. When two or more processing units attempt to gain access at the same time, access is awarded based on a priority arrangement. Prior art priority arrangements have been based on the address of the requesting processing units in which the address of the requesting units are required to be transmitted to a communication controller which compares the addresses to determine which processor unit has priority of access to the channel. The data is then required to be transmitted by the winning processing unit. This type of processing operation increases the time to transmit the data between the processing units. It is therefore the principal object of this invention to provide a contention circuit which will automatically award priority of access to a requesting processing unit without requiring the transfer of any data between the requesting processing units. It is a further object of this invention to provide a LSI semiconductor chip for controlling the transmission of data between a plurality of processing units.

SUMMARY OF THE INVENTION

In order to carry out these objects, there is provided a LSI semiconductor controller chip which is associated with each processing unit of a system comprising a plurality of processing units for controlling the transfer of data between peripheral devices associated with each of the processing units or between other processing units. Included in the controller chip are logic circuits for awarding priority of access to the communications channel when two or more processing units are requesting access to the channel. Utilizing its own address, the contending controller chip will generate a plurality of transitions on the channel during the time a binary one appears in the address of the contending processing unit and will listen to the channel during the time a binary zero appears in the address. If during the time the controller chip is listening to the channel it hears transitions on the channel, the processing unit drops out of contention for the channel. Priority is awarded to the processing unit that detects no transitions at the completion of the processing of its address.

BRIEF DESCRIPTION OF THE DRAWINGS

FIG. 2 is a diagram of the frame message used in the communications system indicating the bit times for each portion of the message;

FIG. 3 is a diagram of the contention portion of the frame message showing the time slots associated with the address bits of the requesting processing unit;

FIG. 4 is a diagram of the contention operation during which access to the communications channel is awarded to the processing unit having the highest priority;

FIGS. 5A and 5B taken together disclose a block diagram of the controller chip;

FIGS. 6A-6F inclusive, taken togethanner in which FIGS. 6A-6F inclusive are to be arranged;

DESCRIPTION OF THE PREFERRED EMBODIMENT

Figure 1:
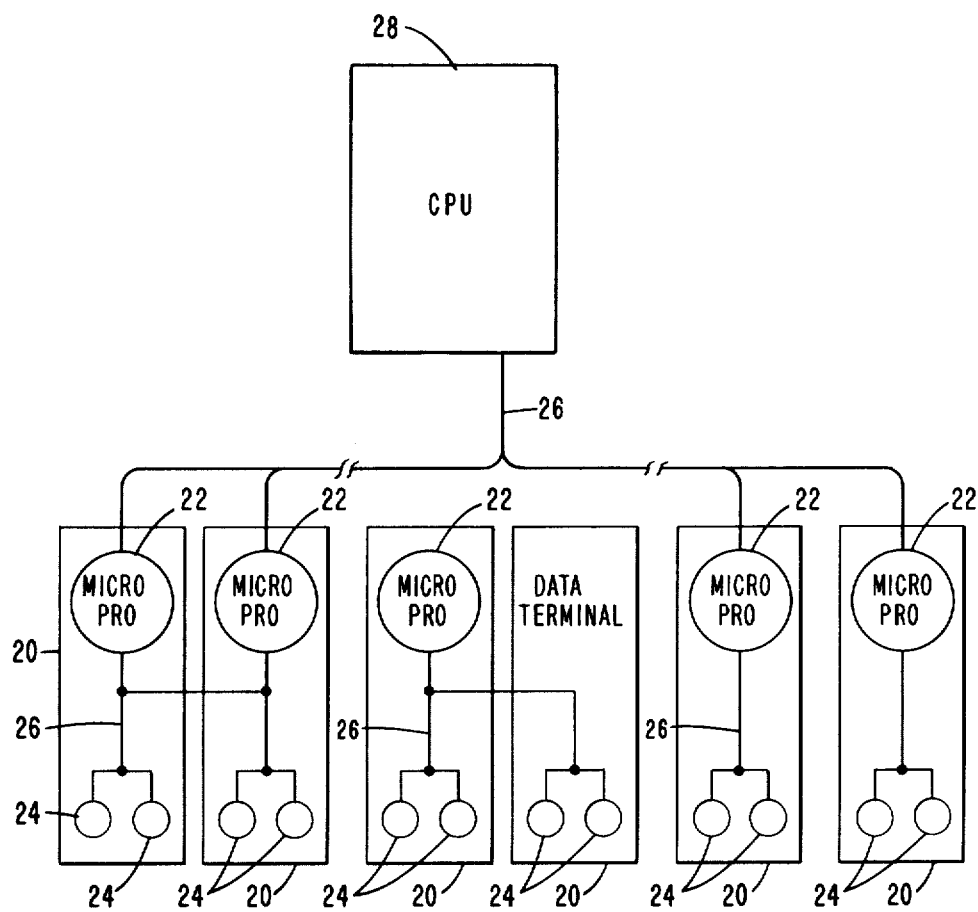
FIG. 1 is a block diagram of a data processing system showing the processing units which compose the system.
Figure 12:
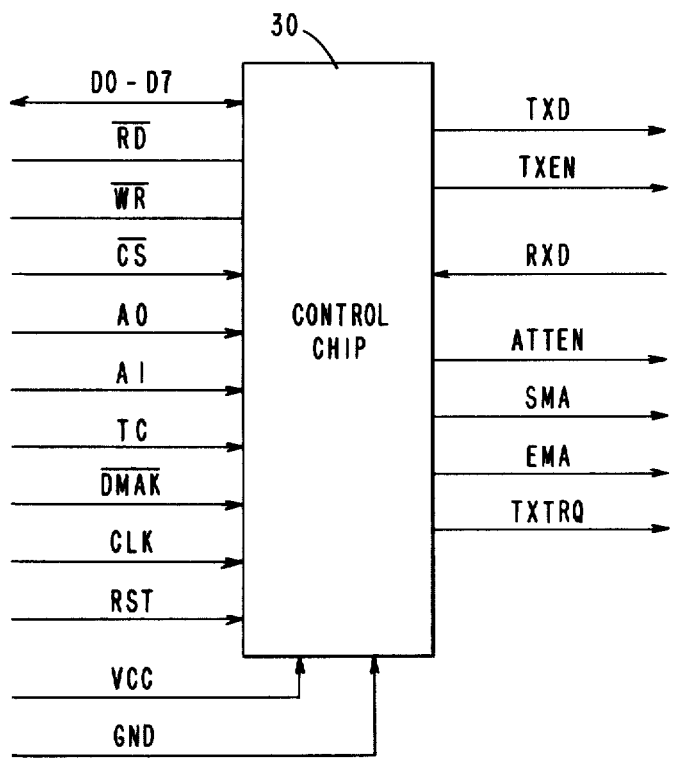
FIG. 12 is a schematic diagram of the pin configuration of the controller chip.

Referring now to FIG. 1, there is shown a data processing system which includes a plurality of processing units 20 which may take the form of data terminal devices which include a microprocessor unit 22 interconnected with a plurality of peripheral devices 24 which may comprise keyboards, display controllers, printer controllers, digital cassette controllers or other I/O devices associated with the functional operation of data terminal devices. Each of the I/O devices 24, together with the data terminals 20 are interconnected by a communications channel 26 which may comprise twisted pairs of wires over which data in serial form is transmitted between the terminal devices themselves and a host processor 28. Controlling the transfer of data on a communications channel 26 is a MOS/LSI communication controller chip 30 (FIG. 12) associated with each of the I/O devices 24 and the microprocessor unit 22. In accordance with the present invention, the chip 30 will initiate the transmission of a data message in response to instructions received from a microprocessor unit (not shown) associated with the chip in the peripheral device.

As will be disclosed more fully hereinafter, the chip 30 cannot begin sending a message unless the channel 26 is in an idle state. The channel 26 is considered in an idle state when the chip detects at least eight successive quiet time slots on the channel. A quiet time slot is defined as being a time period six bits long in which three or less voltage transitions have been detected. Once an idle state is detected, the controller chip 30 will initiate the transmission of a data message which as shown in FIG. 2 starts with a contention phase. As shown in FIG. 3, the contention phase comprises eight time slots with each time slot being characterized as noisy or quiet depending on the address assigned to the controller chip of the I/O devices. In a noisy slot, the controller chip of the sending I/O device will transmit a contention pattern of transitions on the communication channel 26. In a quiet slot, the sending chip monitors the channel to see if any other I/O device is active during the same time slot. The chip will generate a noisy time slot whenever the binary bit one appears in its own or unique address and a quiet time slot whenever the binary bit zero occurs in the address. For purposes of explanation, the unique address of each of the controller chips 30 referred to hereinafter represents the address of the device associated with the chip. The distribution address is the address of the device to which the data message is directed. All communication activity is carried out between the controller chips 30 of the devices. This contention system is illustrated in FIG. 4. Assuming for purposes of illustration that three I/O devices 24 are attempting to gain access to the communications channel 26 with each I/O device having a 4-bit binary address, it will be seen that this arrangement allows up to sixteen I/O devices to be accommodated on the channel. Priority is assigned according to the unique address of the controller chip of the sending I/O device with the address 1111 being assigned to the highest priority I/O device while the address 0000 is assigned to the lowest priority I/O device. As shown in FIG. 3, the first time slot R of the contention phase is always noisy which delimits the contention phase from the previous idle condition of the channel. This is followed by a programmable priority slot P which allows the I/O device to win control of the channel over any of the normally higher priority I/O devices. Otherwise, this would be a quiet slot. The next five slots comprise the unique address of the controller chip 30 with the time slot being noisy for each one bit in the address and a quiet slot for each zero bit with the first bit comprising the most significant bit of the address.

Referring again to FIG. 4, it will be seen that during the time slot associated with the third time slot (FIG. 3) of the contention phase which corresponds to the first bit of the unique address of the I/O device, the time slot of all three I/O devices 24 will be noisy. A controller chip 30 cannot listen when it is driving the channel. During the next time slot, I/O device 1011 senses the presence of a higher priority I/O device because device 1011 is listening during this time slot and hears at least one other device which is noisy. At this time, the I/O device 1011 immediately drops out of contention. During the occurrence of the next time slot, the remaining I/O devices are quiet and therefore do not hear anything being transmitted on the communication channel 26. Upon the occurrence of the fourth time slot, I/O device 1100 will sense the presence of the higher priority I/O device 1101 and will immediately drop out which leaves device 1101 in a position to start sending its message over the communications channel 26.

Figure 5B:
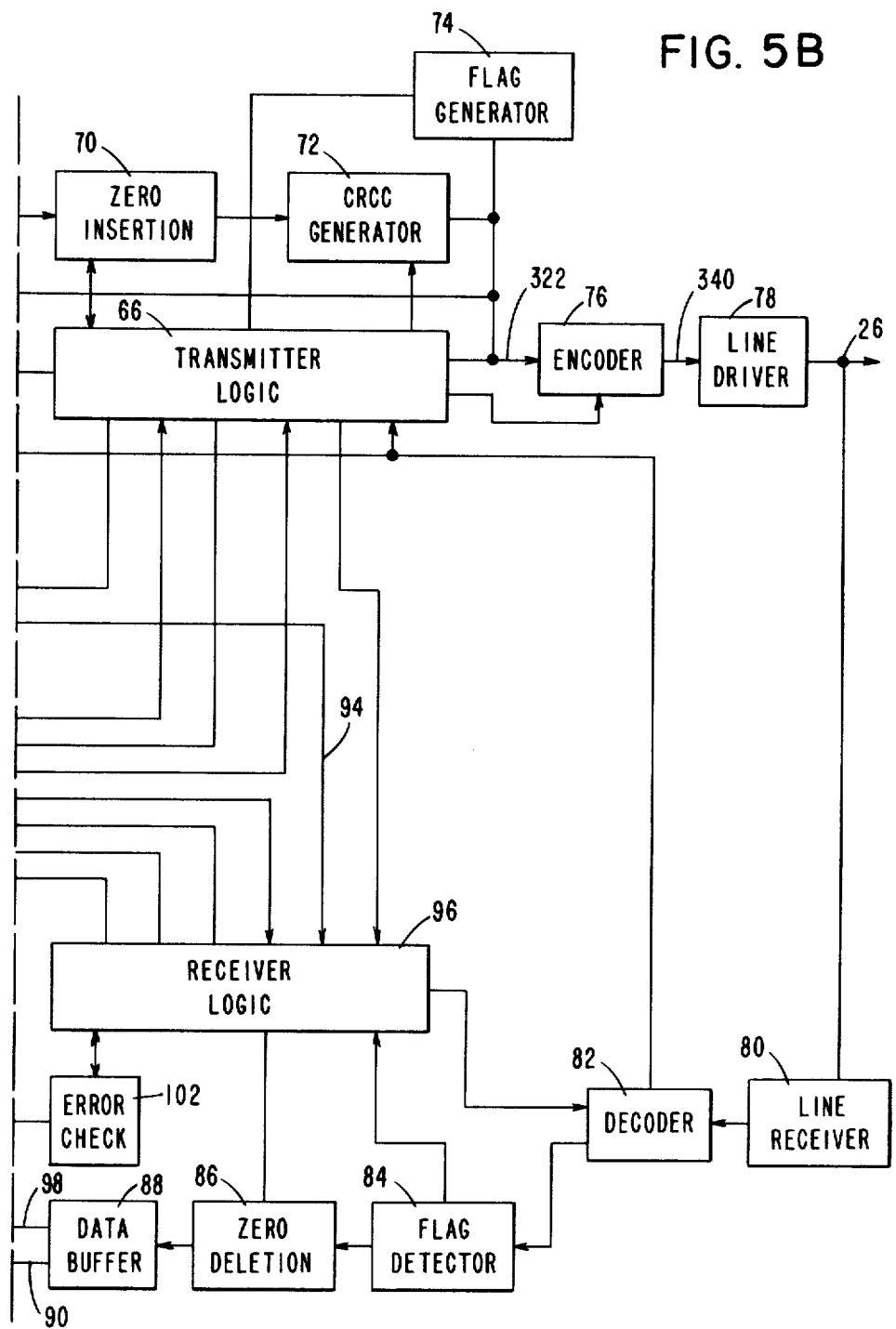

Referring now to FIGS. 5A and 5B, there is disclosed a block diagram of the controller chip 30. Included in the chip is a broadcast address register 32 for storing the broadcast address of the I/O device 24 associated with the chip 30. As previously described, the controller chip 30 of each I/O device is assigned a unique address identifying that controller chip and the device and a broadcast address which identifies the terminal within which the device is located. This latter address is stored in the register 32 while the unique address is stored in the register 34 at the time power is supplied to the chip. Further included in the chip 30 is a control register 36 which stores data for controlling the operation of the chip; an input data register 38 which stores the data to be transmitted over the communications channel 26; an output data register 40 for storing the data received from the communication channel 26 for the I/O device; a status register 42 for storing data representing the status of the microprocessor 22 communicating with the chip 30 and an output buffer 44 for storing interrupt signals for use in communicating with the microprocessor 22 in a manner that is well-known in the art.

Connected to the registers 32–42 inclusive is a control logic unit 46 which includes a 4.8 MHz. oscillator for generating clock signals used in the operation of the chip 30. The control logic unit 46 receives control signals from the microprocessor associated with the chip over an eight bit data bus 23. Included in these signals are the signals A0 and A1 transmitted over lines 48 and 50 which are part of the data bus 23 (FIG. 1), the active low write signal $\overline{WR}$ received over line 52 and the active low read signal $\overline{RD}$ transmitted over line 54. These signals control the selection of the registers 32–44 inclusive in addition to notifying the chip 30 of a write or read operation requested by the microprocessor 22.

The control logic unit 46 also receives over line 56 an acknowledgement signal DMDACK when a DMA chip is used in controlling message transfers between the chip 30 and the main storage memory. A chip select signal $\overline{CS}$ is transmitted over line 58 while a reset signal $\overline{RESET}$ is transmitted over line 60. If a DMA chip is employed, a signal TC appearing on line 62 notifies the chip 30 that the present DMA cycle is the last cycle for the data being transferred to the input data register 38.

When the microprocessor 22 of a terminal 20 (FIG. 1) or the microprocessor associated with each peripheral device 24 is requesting a write operation, the unique address of the controller chip associated with the microprocessor 22 or the device 24 is transmitted from the address register 34 (FIG. 5A) to the contention circuitry 64 for determining if the channel 26 is available for transmission. If it is, the transmitter logic unit 66 (FIG. 5B) will enable a parallel-to-serial converter 68 (FIG. 5A) to output over line 142 the data stored in the input data register 38 to a zero insertion unit 70 (FIG. 5B) which inserts zero bits in the data as required to keep the data bit pattern from matching the flag pattern. A frame check generator 72 inserts the sixteen bit frame check sequence bits into the frame message (FIG. 2) for use in detecting the presence of transmission errors within the message. A flag generator 72 generates flag characters at the beginning and at the end of the message frame (FIG. 2). A biphase encoder unit 76 encodes the outgoing binary message into a biphase coded transmission data in which a binary bit one is represented by a series of transitions having a frequency of 300 KHz. while the binary bit zero is indicated by transitions having a frequency rate of 150 KHz. This data is outputted over the communication channel 26 by the line driver 78.

When the controller chip 30 is receiving data over the communication channel 26, the data is transmitted through a line receiver unit 80 and is decoded by the decoder unit 82 which recovers bit-cell clock information from the incoming biphase signals and reproduces the original binary data. A flag detector unit 84 and a zero deletion unit 86 detects the flag patterns on a bit-by-bit basis and deletes any zero bits which were inserted into the frame check bit stream during transmission. The recovered data is assembled in a data buffer 88 on a byte by byte basis from which the addressed portion of the data message is transmitted over line 90 to an address comparison unit 92 (FIG. 5A) which compares the addressed portion of the received message with the unique and broadcast addresses stored in the registers 32 and 34 to identify the controller chip 30 for which the message is intended. The result of the comparison operation is transmitted over line 94 to a receiver logic unit 96 which controls the processing of the received message.

The received message stored in the data buffer 88 is transmitted over line 98 to a serial-to-parallel converter 100 (FIG. 5A) after which the error check unit 102 (FIG. 5B) checks the frame check portion of the message (FIG. 2) to detect any transmission errors within the frame. The converter 100 will output the received data in an 8-bit parallel form for storage in the output data register 40 prior to transmission of the data to the host processor over the data bus 23.

Figure 6B:
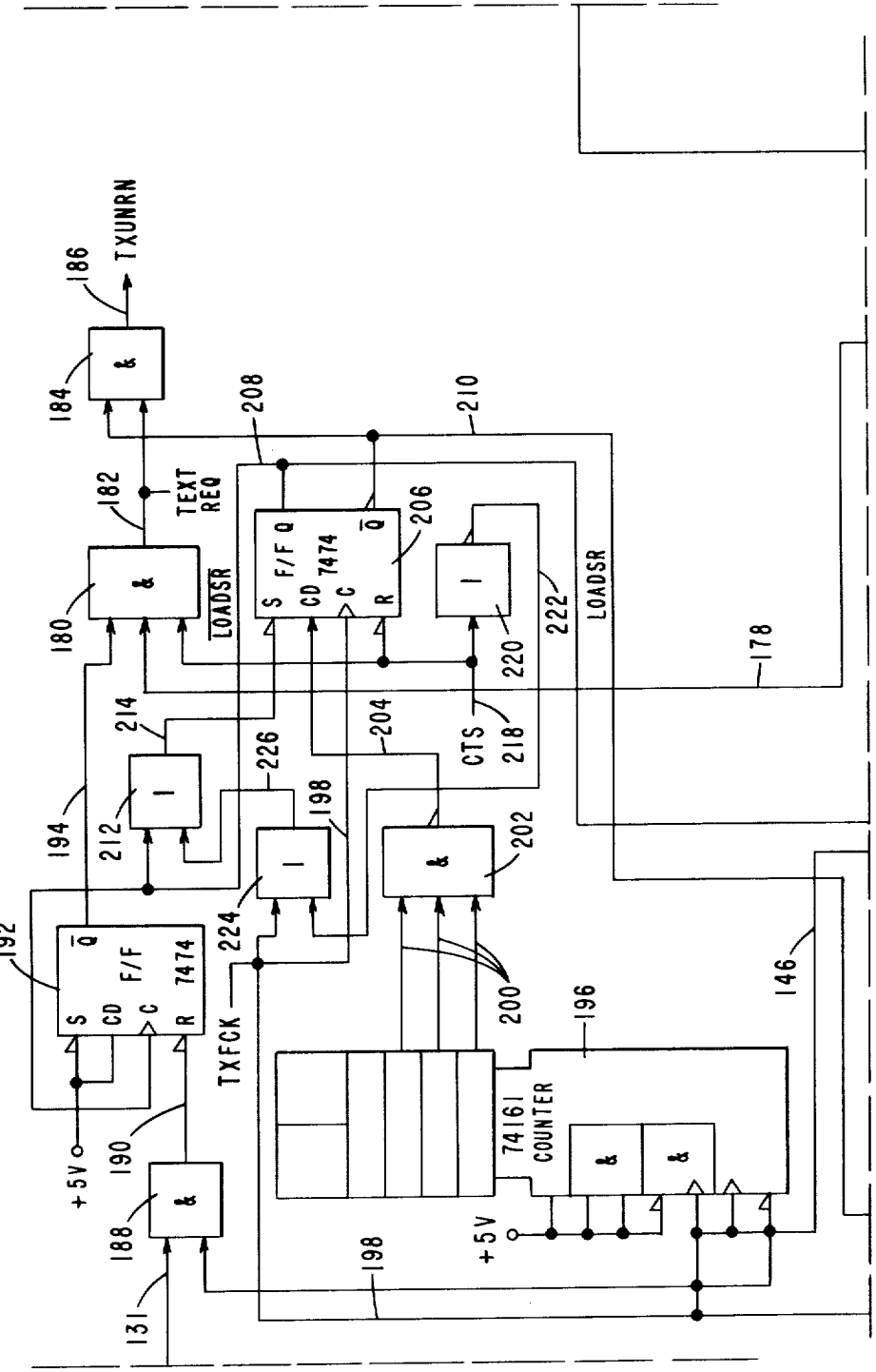
Figure 6C:
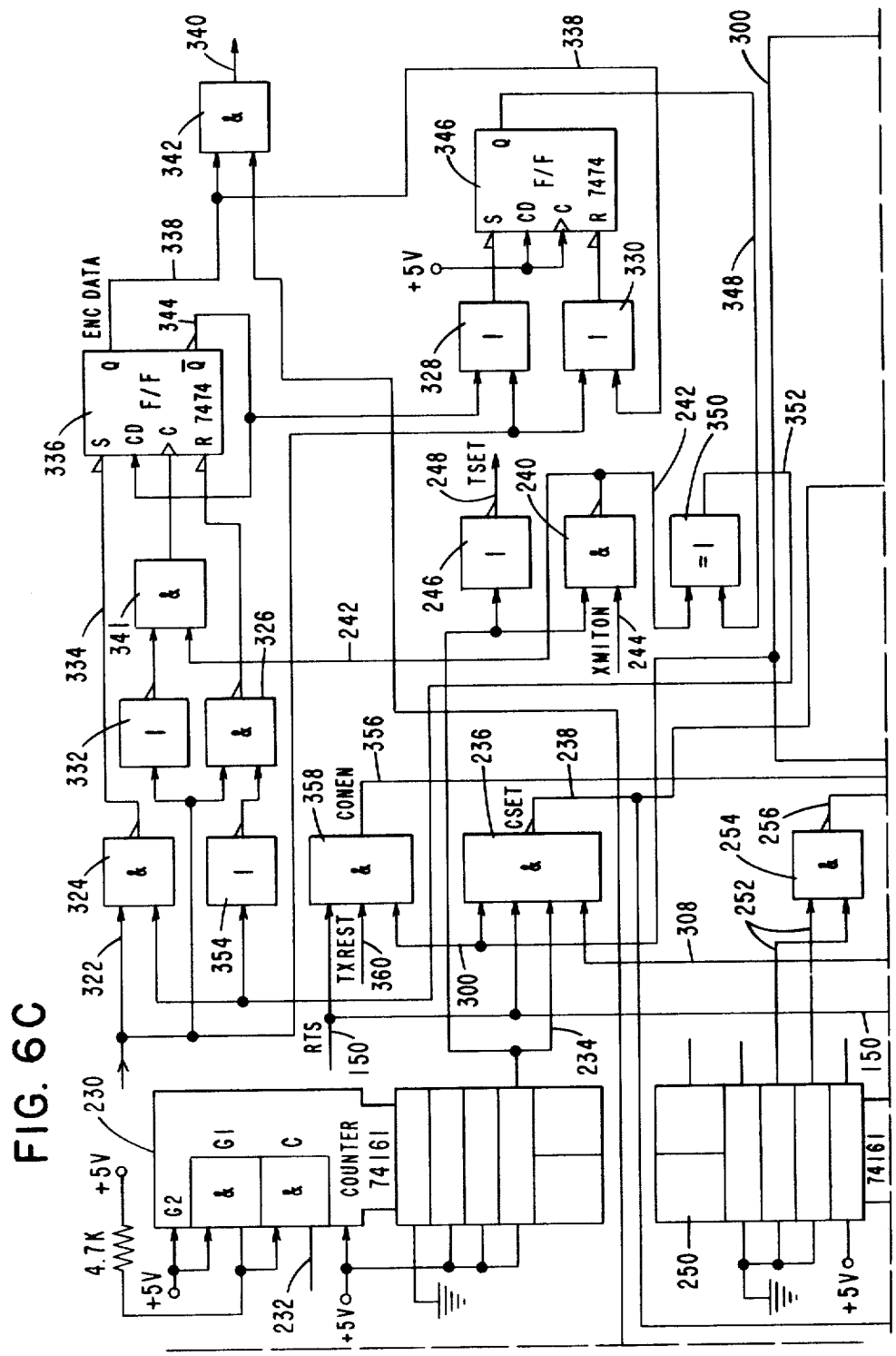
Figure 6D:
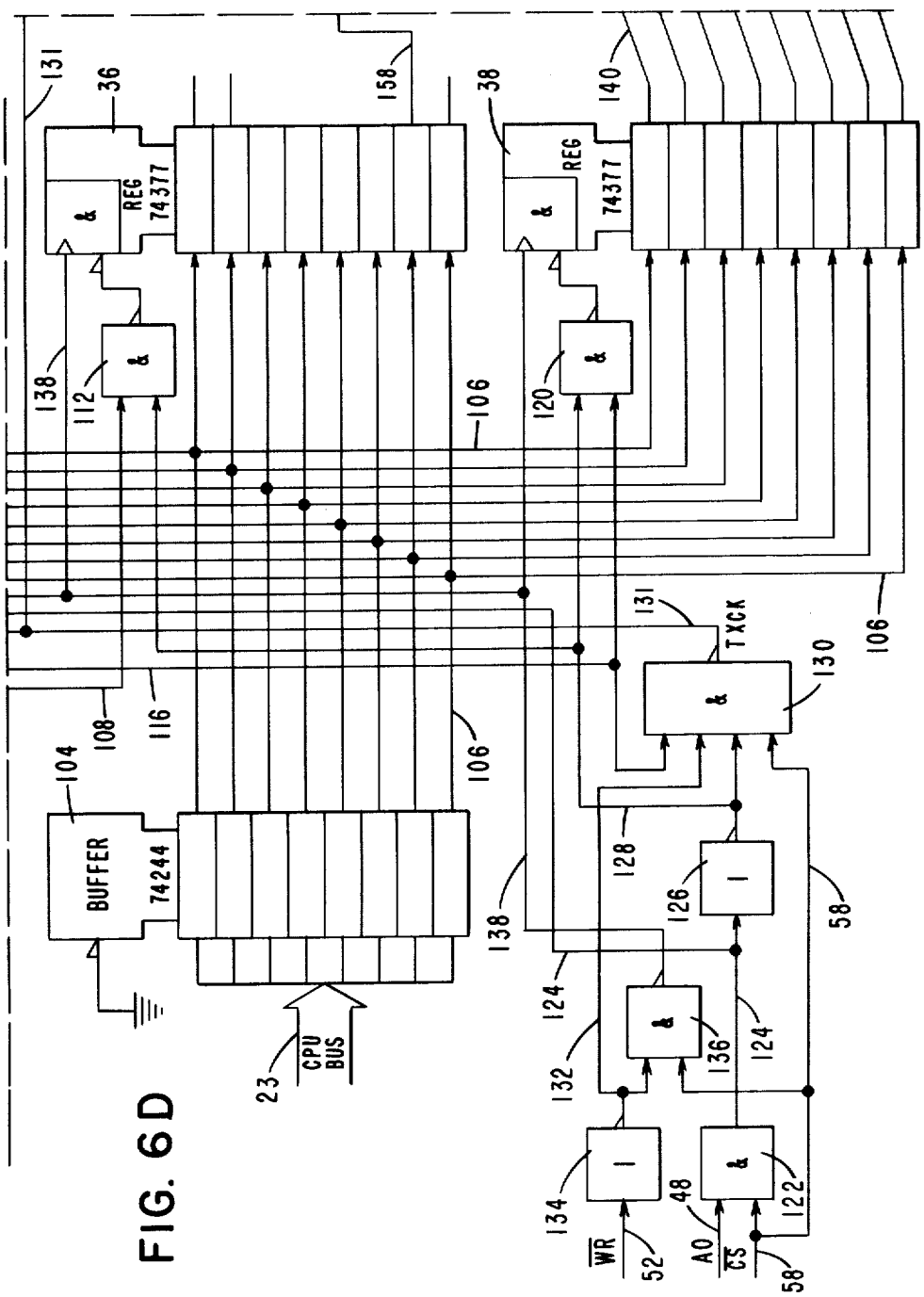

Referring now to FIGS. 6A–6F inclusive, there is disclosed logic circuitry associated with the contention phase and data transmission operation of the chip 30. As shown in FIGS. 6A and 6D, the 8-bit parallel data bus 23 is connected to a 74244 buffer 104 through which input data is received from either the microprocessor 22 (FIG. 1) or the microprocessor associated with the chip 30 and transmitted over lines 106 to the broadcast address register 32 (FIGS. 5A and 6A), the unique address register 34, the control register 36 (FIGS. 5A and 6D) and the input data register 38. The 74377 registers 32–38 inclusive are selectively enabled to receive the data appearing on lines 106 by the control signals A0, A1, $\overline{CS}$ and $\overline{WR}$ generated by the microprocessor 22. For purposes of this disclosure, it will be assumed that the chip 30 is communicating with the microprocessor 22 (FIG. 1).

As shown in FIG. 6A, an AND gate 107 receives the chip select signal $\overline{CS}$ over line 58 and the control signal A1 over line 50. The output signal of gate 107 is transmitted over line 108 to a NAND gate 110 located in the control logic unit 46 (FIG. 5A) which is connected to the broadcast address register 32 and a NAND gate 112 (FIG. 6D) connected to the control register 36. The output signal of the AND gate 107 (FIG. 6A) is outputted to an inverter 114 whose output signal is transmitted over line 116 to a NAND gate 118 connected to the unique address register 34 (FIG. 6A) and the NAND gate 120 connected to the input data register 38 (FIG. 6D).

The other inputs to the AND gates 110, 112, 118 and 120 are derived from an AND gate 122 (FIG. 6D) which receives the control signals A0 and $\overline{CS}$. The output signal of AND gate 122 is transmitted over line 124 to the NAND gates 110 and 118 (FIG. 6A). The output signal is also inverted by an inverter 126 (FIG. 6D) whose output signal is transmitted over line 128 to the NAND gates 112 and 120. It will be seen by varying the voltage level of the signals A0 and A1, the registers 32–38 inclusive can be selected to receive the data appearing on the lines 106.

Figure 11A:
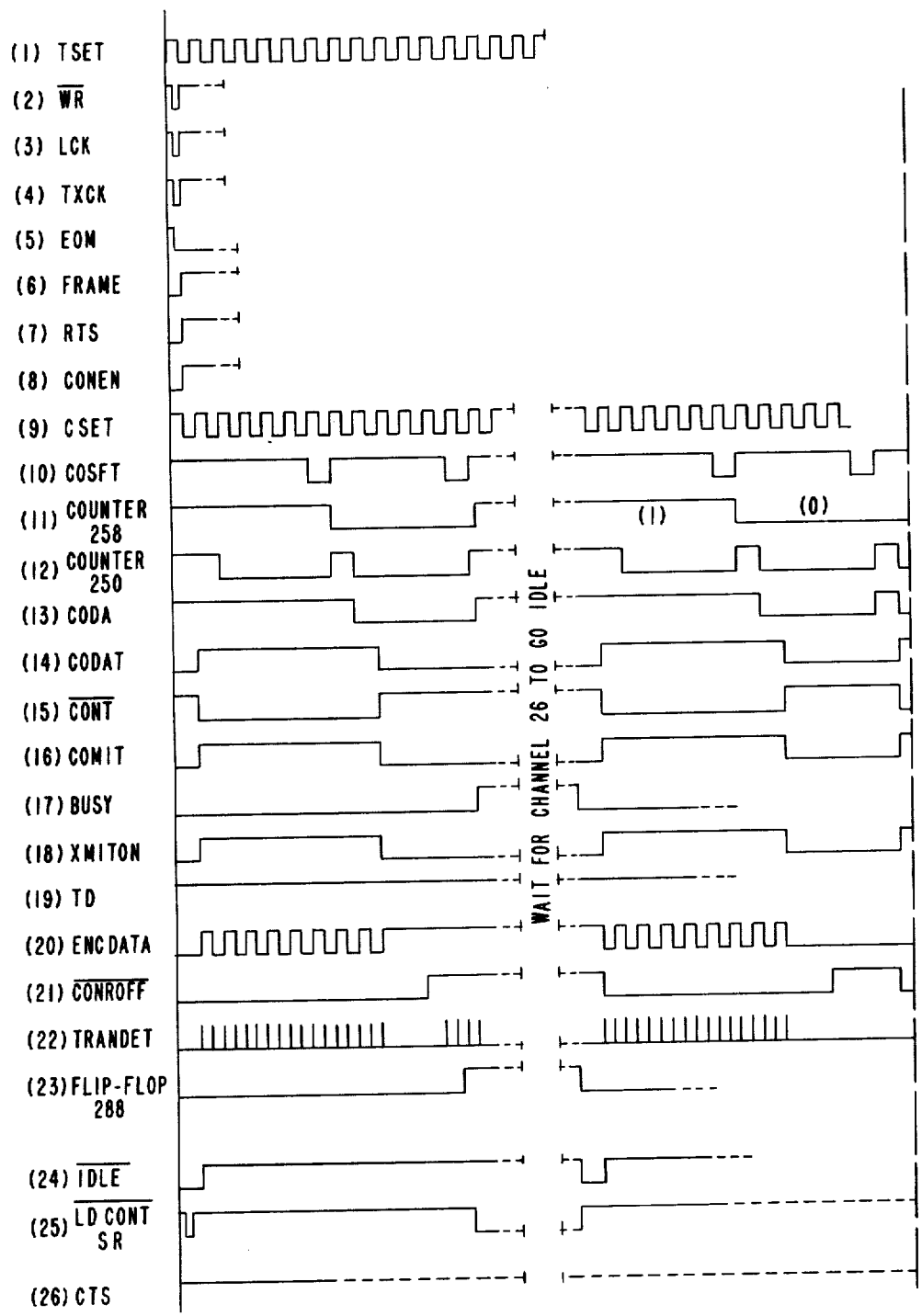
FIGS. 11A and 11B taken together disclose a timing diagram of the control signals generated during the contention phase of the operation of the controller chip.

The output signal from the inverter 126 is also inputted into one input of an AND gate 130 (FIG. 6D). The gate 130 also receives the inverted write signals $\overline{WR}$ transmitted over line 132 from the inverter 134 and the output signal of the inverter 114 (FIG. 6A) transmitted over line 116 and the chip select signal $\overline{CS}$ transmitted over line 58. As shown in FIGS. 11A-2, when the signal $\overline{WR}$ goes low, the NAND gate 130 will output a transmit enable clock signal TXCK (FIG. 11A-4) over line 131 which initiates the operation of the contention circuitry 64 (FIG. 5A) in a manner that will be described more fully hereinafter.

The inverted signal $\overline{WR}$ outputted from the inverter 134 (FIG. 6D) over line 132 is also inputted into an NAND gate 136 which also receives the chip select signal $\overline{CS}$ over line 58. The gate 136 will output the latch clock signal LCK (FIG. 11A-3) over line 138 clocking the registers 32–38 inclusive. The 8-bit data character outputted over lines 106 (FIG. 6D) is loaded into the input data register 38 and is outputted over lines 140 to a 74165 parallel-to-serial converter 68 (FIGS. 5A and 6E) which outputs the serial data over line 142 to the zero insertion circuit 70 (FIGS. 5B) during a data transmission operation.

The transmit enable clock signal TXCK (FIG. 11A-4) appearing on line 131 is transmitted to the clock input of a 7474 flip-flop 144 (FIG. 6E) which clocks the flip-flop to output the signal FRAME (FIG. 11A-6) over the Q output line 146 to the inverted set input of a 7474 flip-flop 148 which in turn outputs the request to send signal RTS (FIG. 11A-7) over line 150. As will be described more fully hereinafter, the signal RTS will initiate a contention operation.

The signal FRAME appearing on line 146 also resets a 7474 flip-flop 152 (FIG. 6E) whose Q output signal is transmitted over line 154 to one input of a NAND gate 156. The other input of the gate 156 is connected over line 158 to the output of the control register 36 (FIG. 6D). When the last data character to be transmitted is loaded into the data register 38 (FIG. 6D), an end of message signal will appear on line 158 enabling the NAND gate 156 (FIG. 6E) to output a low signal over line 160 to one input of a AND gate 162 whose other input receives a transmit reset signal $\overline{XRSET}$ over line 164 which is high at this time. The AND gate 162 will output a low signal over line 166 to the inverted set input of a 7474 flip-flop 168 whose Q output end of message signal EOM (FIG. 11A-5) is transmitted over line 170 to a NAND gate 172 enabling the gate to output a reset signal to the flip-flop 144 resetting the flip-flop.

The transmit enable clock TXCK (FIG. 11A-4) appearing on line 131 (FIG. 6D) is also transmitted to the inverted reset inputs of the 7474 flip-flops 168 and 174 (FIG. 6E). The Q output signals from the flip-flop 168 and 174 are inputted into an AND gate 176 (FIG. 6E) whose transmit enable output signal XENABLE is transmitted over line 178 to one input of a AND gate 180 (FIG. 6B) conditioning the AND gate to output the signal TEXT REQ over line 182 to one input of an AND gate 184. This signal is outputted from the output buffer 44 (FIG. 5A) to the microprocessor 22 requesting an 8 bit character of the message to be transmitted. If the processor 22 fails to send a data character, the AND gate 184 will be conditioned to output the transmit underrun signal TXUNRN over line 186 notifying the controlling chip of this condition which stops the transmitting operation. The transmit enable clock TXCK (FIG. 11A-4) is also transmitted over line 131 to one input of AND gate 188 (FIG. 6B) whose output signal over line 190 controls the resetting of a flip-flop 192 whose Q output line 194 is connected to one input of the AND gate 180.

The signal FRAME (FIG. 11A-6) appearing on line 146 (FIG. 6E) is transmitted to the reset input of a 74161 sixteen bit counter 196 (FIG. 6B) whose output count will control the transfer of each character of the message (FIG. 2) from the data register 38 (FIG. 6D) to the parallel-to-serial converter 68 (FIGS. 5A and 6E). The counter 196 is clocked by the transmit frame clock signals TXFCK appearing on line 198 and which is a gated TXCK. The binary signals representing the output count of the counter 196 is transmitted over lines 200 to an AND gate 202. Upon the counter 196 reaching a count of 7, the output of the AND gate 202 is low. When the next count appears on the line 200, representing the eighth binary bit of the character being loaded into the register 68 from the input data register 38 (FIGS. 5A and 6D), the AND gate 202 will output a high signal over line 204 to a flip-flop 206. Upon the presence of the rising edge of the next clock signal TXFCK appearing on line 198, the low load shift register signal $\overline{\text{LOADSR}}$ will appear on the Q output line 208 of the flip-flop 206 while the inverted signal SRLOAD will appear on the $\overline{\text{Q}}$ output line 210. The signal $\overline{\text{LOADSR}}$ will clock the flip-flop 192 (FIG. 6B) thereby conditioning the AND gate 180 to output the signal TEXT REQD (FIG. 5A) to the microprocessor 22 (FIG. 1) notifying the microprocessor to load the first byte of the message that is to be transmitted into the input data register 38 (FIG. 6D).

The signal $\overline{\text{LOADSR}}$ is also inputted into a NOR gate 212 whose output line 214 is connected to the inverted set input of the flip-flop 206 enabling the set input to remain low. The signal $\overline{\text{LOADSR}}$ is transmitted over line 208 to the parallel to serial converter 68 (FIG. 6E) enabling the byte of data appearing on the output line 140 of the input data register 38 (FIGS. 5A and 6D) to be parallel loaded into the converter 68. The signal $\overline{\text{LOADSR}}$ also clocks the flip-flop 152 (FIG. 6E) to initiate an EOM (end of message) indication in the DMA Mode when the signal TC becomes active. The signal LOADSR appearing on the $\overline{\text{Q}}$ output line 210 of the flip-flop 206 (FIG. 6B) enables the AND gate 184 to output the signal TXUNRN over line 186 to the transmitted logic unit 66 (FIG. 5B). The signal LOADSR is also inputted into one input of the NAND gate 172 (FIG. 6E) conditioning the gate to reset the flip-flop 144 upon the generation of an EOM condition.

Figure 11B:
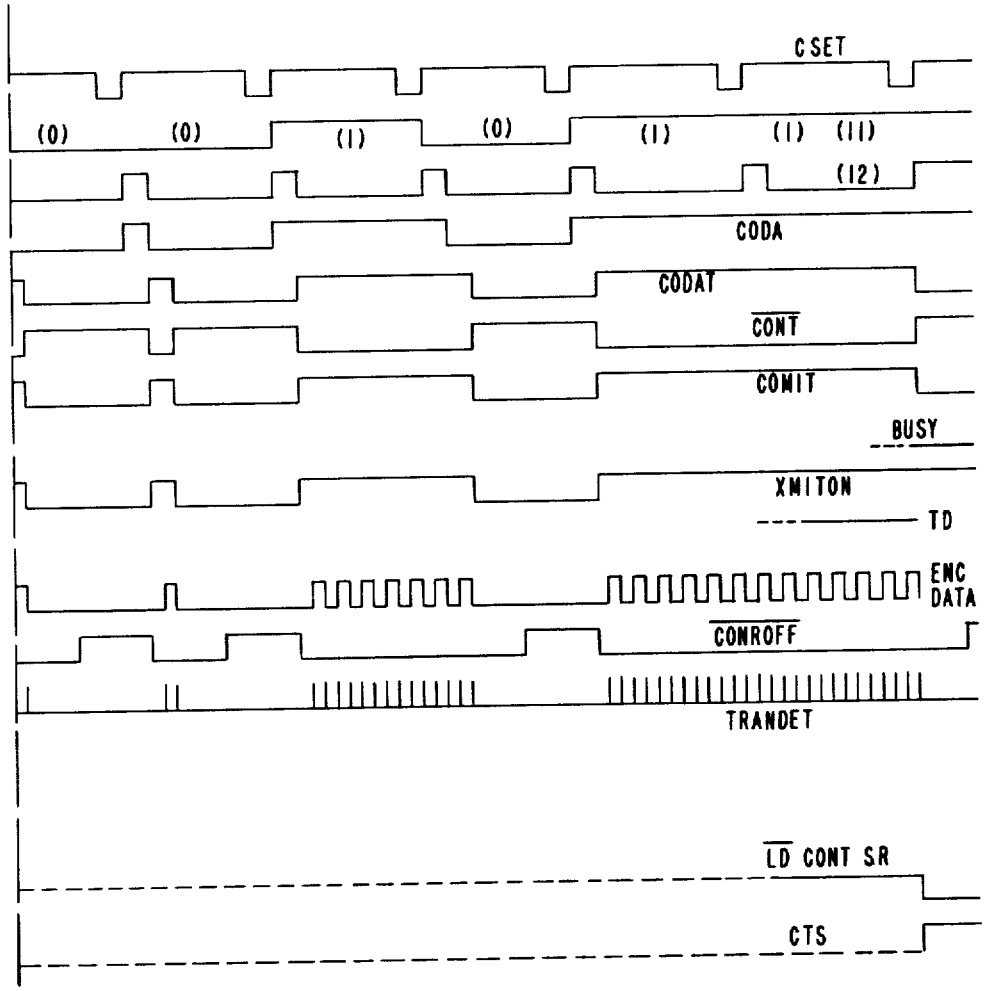

As will be described more fully hereinafter, once the controller chip has gained control of the communication channel 26, a clear to send signal CTS (FIG. 11B 26) appearing on line 218 (FIG. 6B) will go high which is inverted by the inverter 220 and transmitted over line 222 to one input of the NOR gate 224 which receives the transmit frame clock signal TXFCK over line 198. The NOR gate will output a high signal over line 226 to the NOR gate 212 which outputs a high signal over line 214 to the inverted set input of the flip-flop 206 enabling the flip-flop to output the signal $\overline{\text{LOADSR}}$ when clocked by the signal TXFCK over line 198.

Also located in the control logic unit 46 (FIG. 5A) is a 74161 16 bit counter 230 (FIG. 6C) which receives over line 232 the clock signals from the 4.8 MHz. oscillator 46 (FIG. 5A). The counter will divide the input clock signals by sixteen to output over line 234 the clock signals operating at a 300 KHz. frequency. These signals are transmitted to the contention circuitry unit 64 (FIG. 5A) enabling the circuitry to operate. The 300 KHz. clock signals appearing on the output line 234 are inputted into the NAND gate 236 (FIG. 6C) which outputs the contention clock signals CSET (FIG. 11A-9) over line 238. The 300 KHz. clock signals on line 234 are also inputted into a NAND gate 240 which will output the clock signals over line 242 to the encoder 76 (FIG. 5B) enabling the encoder to encode the outputted data. The NAND gate 240 is enabled by the transmit on signal XMITON appearing on line 244. The 300 KHz. clock signals appearing on line 234 are inverted by the inverter 246 and outputted over line 248 as the transmit clock signals TSET (FIG. 11A-1).

The contention clock signals CSET appearing on line 238 are transmitted to a 74161 16 bit counter 250 (FIGS. 6C and 6F) which when enabled will count the clock signals. The counter 250 counts up to six representing the duration of one of the eight time slots which occur during a contention operation. Upon reaching a count of six, the binary signals appearing on the output lines 252 (FIG. 6C) of the counter 250 are inputted into a NAND gate 254 whose output contention shift signal COSFT (FIG. 11A-10) is transmitted over line 256 (FIGS. 6C and 6F) to a 74165 shift register 258 (FIG. 6F). The shift register 258 has received over the parallel input lines 260 the unique address data bits stored in the register 34 (FIGS. 5A and 6A). The signal COSFT will cause the shift register 258 to serially shift out the bits of the unique address over line 262 to the 7474 latch member 264. As will be described more fully hereinafter, the signal on the Q output line 266 of the latch member 264 will be high if the unique address bit is a one and low when the bit is a zero.

The Q output line 266 of the latch 264 is inputted into a AND gate 268 which also receives the high request to send signal RTS (FIG. 11A-7) over line 150 and another signal over line 308 which is high during a contention operation. The output line 272 of the AND gate 268 is inputted into the AND gate 274 whose output contention signal $\overline{\text{CONT}}$ (FIG. 11A-15) appearing on line 276 controls the operation of the transmitter logic unit 66 (FIG. 5B) and the receiver logic unit 96 in a manner that will be described more fully hereinafter. The signal $\overline{\text{CONT}}$ is inputted into a NOR gate 278 which outputs the contention transmit signal COMIT (FIG. 11A-16) used in controlling the transmitter logic unit 66 to transmit a plurality of binary one bits during a noisy time slot.

The signals appearing on the $\overline{\text{Q}}$ output line 283 of the latch 264 (FIG. 6F) is inputted into an AND gate 284 whose output signal appearing on line 286 controls the resetting of a 7474 flip-flop 288 and 290. Appearing on the clock input lines 292 of the flip-flop 288 and 290 is the transition detect signal TRANDET (FIG. 11A-22) which goes high upon sensing a transition on the communications channel 26 (FIG. 1). Appearing on the data input line 294 to the flip-flop 288 is the contention receiver off signal $\overline{\text{CONOFF}}$ (FIG. 11A-21) whose signal level indicates whether the receiver unit 96 is on or off. Clocking of the flip-flop 288 by the signal TRANDET together with the appearance of the high signal $\overline{\text{CON ROFF}}$ on line 294 will result in the outputting of a high signal (FIG. 11A-23) over the Q output line 96 to the flip-flop 290 which outputs the busy signals BUSY (FIG. 11A-17) over line 298 and $\overline{\text{BUSY}}$ over line 300. These signals will reset the contention circuitry, thereby stopping the contention operation whenever transitions are detected during a quiet slot of the contention operation.

Further included in the contention circuitry 64 (FIG. 5) is a 74165 counter 302 (FIG. 6F) which counts the contention shift signals COSFT (FIG. 11A-10) appearing on line 256 each representing a contention time slot, which, as described previously, may be quiet or noisy. If the counter 302 reaches a count of 8 indicating that the controller chip 30 has won control of the communications channel 26 (FIG. 5D), a high clear to send signal CTS (FIG. 11B-26) will appear on the output line 304.

This signal is inverted by the inverter 306 and outputted over line 308 to one input of the AND gates 268 and 274 enabling the gate 274 to output the contention signal $\overline{CONT}$ which, as will be dFIG. 6C). This signal is derived from the request to send signal RTS appearing on line 150 and which is inputted into the AND gate 358 (FIG. 6C) which also receives the signal $\overline{BUSY}$ over line 300 and a transmit reset signal TXREST appearing on line 360. The $\overline{BUSY}$ signal is also transmitted over line 300 (FIG. 6C) to one input of an AND gate 362 (FIG. 6F) which controls the resetting of the flip-flop 264.

The signal $\overline{CTS}$ appearing on line 308 is inputted into an AND gate 310 (FIG. 6F) which also receives an idle signal $\overline{IDLE}$ over line 312 which will be low when the communications channel 26 is idle, that is, no transitions are detected indicating the channel is available for transmission of a message. The output signal of the AND gate 310 which appears on the output line 314 controls the resetting of the flip-flops 288 and 290 initiating another contention operation if the controller chip 30 has failed to win control of the channel 26. The signal $\overline{CTS}$ appearing on line 308 is also inputted into an AND gate 316 (FIG. 6F) whose output signal $\overline{LOAD}$ CONT. S.R/ (FIG. 11A-25) appearing on line 318 reloads the shift register 258. The signal $\overline{CTS}$ is also inverted by the NAND gate 320 whose output signal CTS is used to control the transmitter logic unit 66 (FIG. 5B) during a transmission operation.

Referring to FIG. 6C, there is shown a portion of the encoder unit 76 (FIG. 5B) which, during a noisy time slot (FIG. 4) of the contention phase, will encode a plurality of transitions for a period of six bit times. The encoder 76 will output 300 KHz. signals if the transmitted data bit TD is a binary one and 150 KHz. signals if the data bit TD is a binary zero. When the data bit TD appearing on 322 is low representing the binary zero, the flip-flop 336 is toggled resulting in 150 KHz. signals appearing on the output line 338. The transmitted data bit TD (FIG. 11A-19) is received over line 322 which is inputted into a plurality of logic gates which include the NAND gates 324 and 326, the OR gates 328 and 330 and the inverter 332. The encoded data signals ENC DATA (FIG. 11A-20) will appear on the Q output line 338 of the flip-flop 336 and transmitted to the line driver 78 (FIG. 5B) over line 340 through the AND gate 342.

The flip-flop 336 is clocked by the 300 KHz. signals generated by the divide-by-sixteen counter 230 (FIG. 6C) which signals appear on the output line 242 of the NAND gate 240 and are transmitted through the AND gate 341. The inverted encoded data signals appearing on the $\overline{Q}$ output line 344 of the flip-flop 336 are inputted into the OR gate 328 which outputs the signals to a 7474 flip-flop 346. The signals are then outputted over the Q output line 348 of the flip-flop 346 to one input of an Exclusive OR gate 350 which receives the clock signals over line 242 from the NAND gate 240. The output signals from the Exclusive OR gate 350 are outputted over line 352 alternately enabling the NAND gates 324 and 326 when a high signal appears on line 322. This construction insures that the transmitted data will be continuous when the data shifts between a binary zero and a binary one.

Figure 8:
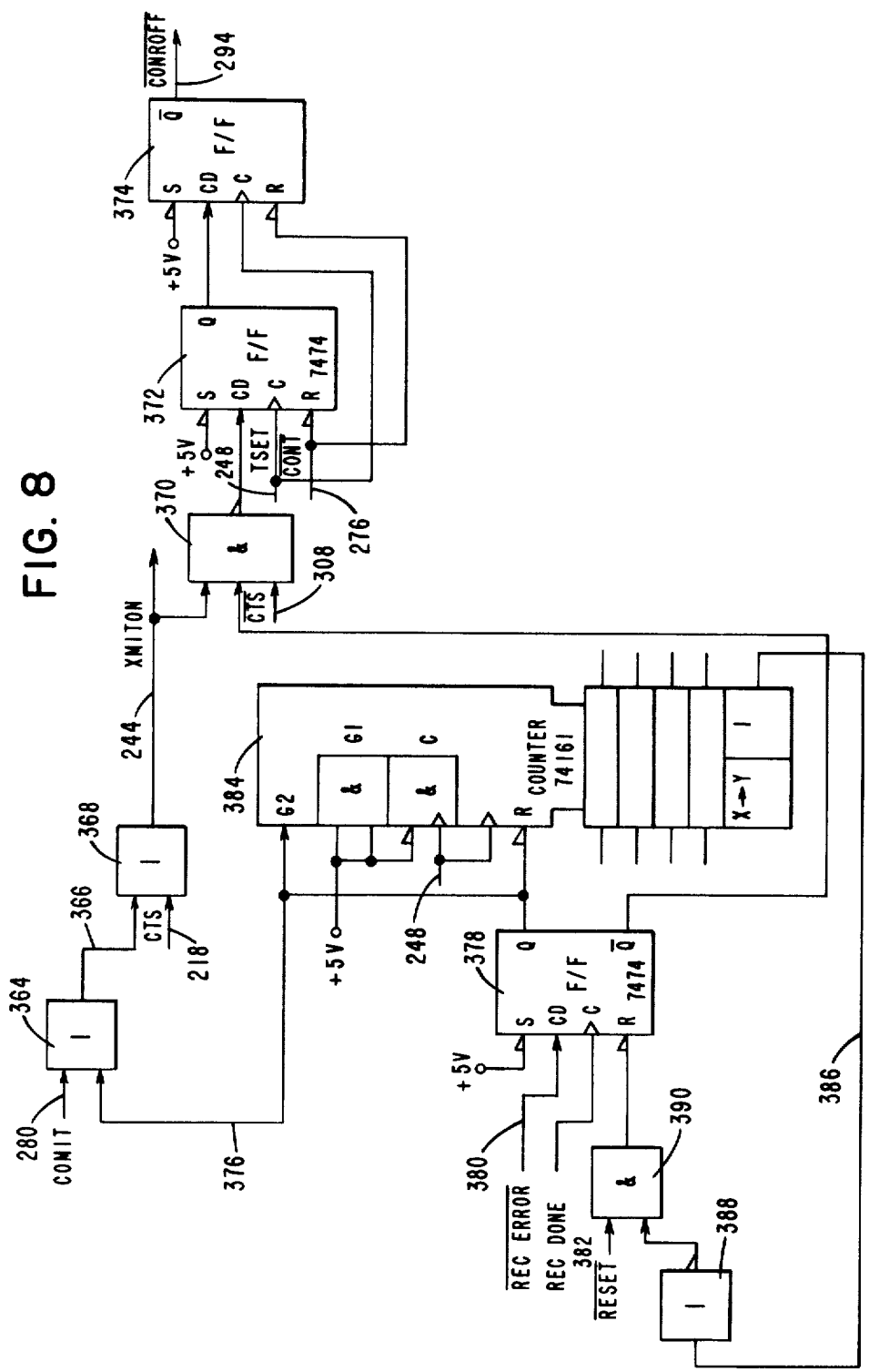
FIG. 8 is a diagram showing the logic circuits used in controlling the transmission of data on the communication channel.

Referring now to FIG. 8, there is shown a portion of the control logic circuit 46 (FIG. 5A) for controlling the operation of the transmitter logic unit 66 and the receiver logic unit 96. Included in the circuit is an OR gate 364 which receives the contention transmit signal COMIT (FIG. 11A-16) outputted from the NOR gate 278 (FIG. 6F) and which is high during a contention operation. This high signal is outputted over line 366 to an OR gate 368 which also receives the clear to send signal CTS over line 218 (FIG. 6F). The transmitter on signal XMITON (FIG. 11A-18) is outputted from the OR gate 368 over line 244 to the transmitter logic unit 66 (FIG. 5B) enabling the transmitter for operation. The signal XMITON is also inputted into a NAND gate 370 which also receives the signal $\overline{CTS}$ over line 308 (FIG. 6F). The output signal from the NAND gate 370 is inputted into the data input of a 7474 flip-flop 372 providing a two-bit time delay. The Q output signal of flip-flop 372 will toggle a flip-flop 374 whose output signal $\overline{CONROFF}$ (FIG. 11A-21) indicates whether the receiver is on or off during a contention operation.

The OR gate 364 also receives a signal over line 376 which provides an acknowledgement to a sending processor unit that the controller chip 30 has received a good message. This signal is outputted by a flip-flop 378 which receives over line 380 the active low receive error signal $\overline{RECERROR/}$ if there is an error in the received message. The flip-flop 378 is clocked by the received done signal REC DONE over line 382 which goes high at the completion of the receiving of the message. The high Q output signal of the flip-flop 378 appearing on line 376 enables a 74161 counter 384 which starts counting the transmit clock pulses TSET (FIG. 11A-1) received over line 248 (FIG. 6C). The high signal appearing on line 376 is also transmitted through the OR gates 364 and 368 resulting in the raising of the signal XMITON which enables the transmitter logic 66 (FIG. 5B) to transmit a series of binary 1's over the communication channel 26. Upon the counter 384 reaching the count of 16, the counter will output a high signal over line 386 which is inverted by the inverter 388 and gated by the AND gate 390 to the reset input of the flip-flop 378 resetting the flip-flop and disabling the generation of the signal XMITON appearing on line 244. The string of sixteen binary bit 1's constitute an acknowledgment to the sending processing unit that a good message was received.

Figure 9:
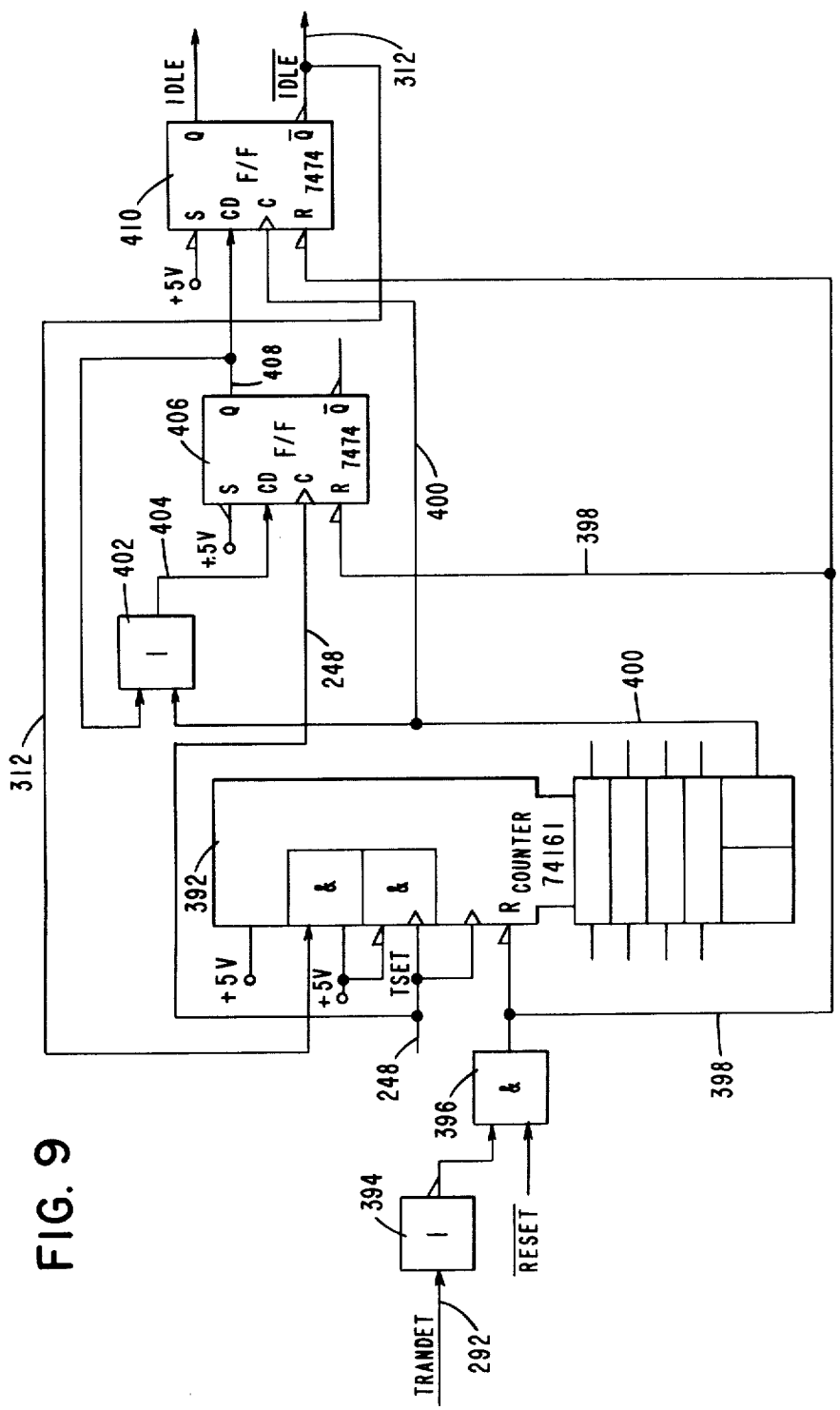
FIG. 9 is a diagram showing the logic circuits for detecting when the communication channel is in an idle state.

Referring now to FIG. 9, there is disclosed the logic circuit for detecting when the communications channel 26 (FIG. 5B) is idle, thereby enabling the controller chip 30 to initiate a data transmission operation. Included in the circuit is a 74161 counter 392 which is reset by the occurrence of the transition detect signal TRANDET (FIG. 11A-22) going high in a manner that will be described more fully hereinafter. The raising of the signal TRANDET indicates the presence of a transition signal on the communications channel 26. This signal appearing on line 292 is inverted by the inverter 394 (FIG. 9) and gated by an AND gate 396 over line 398 to the reset input of the counter 392 resetting the counter. After being reset, the counter counts the transmit clock signals TSET (FIG. 11A-1) appearing on line 248 (FIG. 6C), initiating another counting operation. If the counter 392 reaches a count of 16, the counter will output a high signal over the output line 400 to one input of an OR gate 402, the high signal being inputted over line 404 to the data input of a 7474 flip-flop 406 which, upon the rising edge of the next clock signal TSET appearing on line 248, sets the flip-flop 406 to output a high signal over the Q output line 408 to the data input of a second 7474 flip-flop 410. The flip-flop 410 is clocked by the output signal of the counter 392 appearing on line 400. Upon the next signal outputted by the counter 392 which occurs 16 bit times later, the flip-flop 410 will output the active low signal $\overline{\text{IDLE}}$ (FIG. 11A-24) over line 312 to the AND gate 310 (FIG. 6F). This occurs 32 bit times after the resetting of the counter 392. This arrangement enables the AND gate 310 to output a low signal over line 314 which is gated by the AND gate 284 resulting in the resetting of the flip-flops 288 and 290, thereby removing the high signal BUSY which allows the controller chip 30 to start transmitting the message since no transitions were detected for the last 32 bit times.

Figure 10:
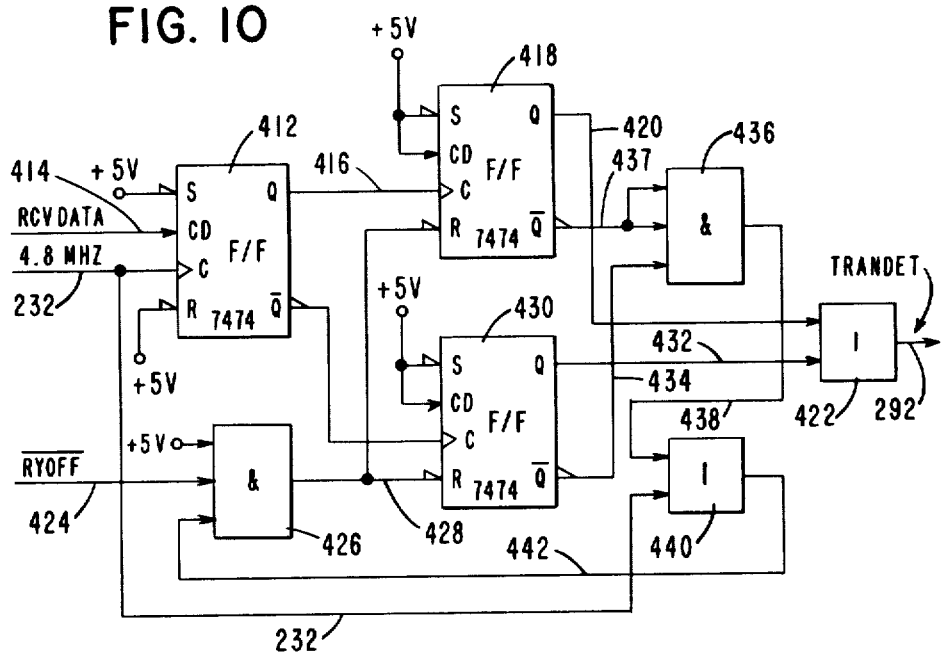
FIG. 10 is a diagram showing the logic circuits for detecting the occurrence of a transition on the communication channel.

Referring now to FIG. 10, there is disclosed the logic circuitry for generating the transition detect signals TRANDET (FIG. 11A-22) which occurs upon the controller chip sensing the presence of transitions on the communications channel 26 (FIG. 5B). Included in the circuitry which is located in the receiver logic unit is a 7474 flip-flop 412 which is clocked by the 4.8 MHz. signals appearing on line 232. The flip-flop 412 receives over line 414 the signals RCV DATA representing transitions appearing on the communications channel 26. When a high signal on line 414 does appear, the flip-flop 412 will output over its $\overline{Q}$ output line 416 a high signal which clocks a second flip-flop 418 which in turn outputs a high signal over line 420 to one input of the OR gate 422. The OR gate 422 outputs the high signal TRANDET over line 292 in response to receiving the high signal over line 420. As previously described, the signal TRANDET will clock the flip-flops 288 and 290 (FIG. 6F) setting the signal BUSY high which resets the contention circuitry 64 (FIG. 5A). The OR gate 422 also receives a low signal over line 432 which is outputted by a flip-flop 430. The $\overline{Q}$ output line 434 outputs a high signal to an AND gate 436 which also receives a low signal over line 437 from the flip-flop 418. The AND gate 436 outputs a low signal over line 438 to an OR gate 440 which also receives the 4.8 MHz. clock signal on line 232. When the 4.8 MHz. clock signal goes low, the AND gate 426 outputs a low signal over line 428 resetting the flip-flops 428 and 430.

When the receiver logic unit 96 (FIG. 5B) turns off the decoder 82, the receive off signal $\overline{\text{RYOFF}}$ (FIG. 10) appearing on line 424 will become active low. This signal is inputted into the AND gate 426 which outputs a low signal over line 428 resetting the flip-flops 430 and 418 conditioning the circuits for another detection operation.

In the operation of the system, the microprocessor 22 (FIG. 1) will transmit over line 52 of the data bus 23 (FIG. 6D) the active low write control signal $\overline{\text{WR}}$ (FIG. 11A-2) together with the control signals $\overline{\text{CS}}$, A0 over lines 48 and 58 and the control signals A1 over line 50 (FIG. 6A). The signals A0 and A1 will enable the register 38 (FIG. 6A) to store the destination address of the processing unit to which the message is to be sent. The control signals also enable the NAND gate 130 (FIG. 6D) to output the transmit enable clock TXCK (FIG. 11A-4) over line 131 which clocks the flip-flop 144 (FIG. 6E) to output the high signal FRAME (FIG. 11A-6) over line 146 indicating the start of the transmission of a block of data. The signal TXCK also resets the flip-flop 168 and 174 (FIG. 6E) which are enabled at the time data is to be transmitted over the communications channel 26. The signal FRAME appearing on line 146 resets the flip-flop 152 (FIG. 6E) and the counter 196 (FIG. 6B) which is operated in loading the parallel-to-serial shift register 68 (FIG. 6E) with the data to be transmitted.

The signal FRAME is also inputted into the set input of the flip-flop 148 (FIG. 6E) which outputs the request to send signal RTS (FIG. 11A-7) over line 150 to the AND gate 358 (FIG. 6C) enabling the gate to output the contention enable signal CONEN (FIG. 11A-8) over line 356. This signal removes the reset signal from the counter 250 (FIGS. 6C and 6F). The counter 250 will count the 300 KHz. Contention clock signals CSET (FIG. 11A-9) which appear on line 238 and outputted by the AND gate 236 (FIG. 6C). The AND gate 236 is enabled by the signal RTS to output the 300 KHz. clock signals appearing on the output line 234 of the counter 230 (FIG. 6C) The counter 250 outputs a high signal over lines 252 (FIG. 6C) after reaching the count of six representing the length of a time slot. The signals appearing on lines 252 are inputted into the NAND gate 254 which outputs the low contention signal COSFT (FIG. 11A-10) over line 256 representing the start of a new time slot.

The low signal COSFT will enable the shift register 258 (FIG. 6F) in which is stored the unique address of the controller chip 30 of the sending processor unit to shift the next bit (FIG. 11A-11) stored in the shift register 258. As shown in FIG. 11A-11, the first bit shifted out of the register 258 is always high indicating that the time slot is to be an active slot or noisy. This high signal is transmitted over line 262 and sets the flip-flop 264 (FIG. 6F) whose high output signal appearing on the line 266 is gated through the AND gate 268 and the NAND gate 274 which outputs the active low contention signal $\overline{\text{CONT}}$ (FIG. 11A-15) over line 276. The signal $\overline{\text{CONT}}$ is gated through the NAND gate 278 and is outputted over line 280 as the active high contention transmit signal COMIT (FIG. 11A-16). The signal COMIT will enable the gate 368 (FIG. 8) to output the signal XMITON (FIG. 11A-18) over line 244 to the transmitter logic unit 66 (FIG. 5B) initiating the transmission of a plurality of transitions over the communication channel 26. The signal XMITON is also inputted into the NAND gate 240 (FIG. 6C) in the encoder 76 (FIG. 5B) enabling the 300 KHz. clock signals outputted by the counter 230 over line 234 to clock the flip-flop 336 to output the binary bits comprising the transmissions occurring during a noisy time slot or the encoded data (FIG. 11A-20) over line 340 to the line driver 78 (FIG. 5B) for transmission over the communication channel 26 during a transmit operation. The signal $\overline{\text{CONT}}$ will reset the flip-flops 372 and 374 (FIG. 8) resulting in the generation of the active low signal $\overline{\text{CONROFF}}$ over line 294 which disables the receiver logic unit 96 (FIG. 5B).

At the conclusion of six bit times representing the duration of one time slot, the counter 250 (FIG. 6C and 6F) will output high signals (FIG. 11A-12) over line 252 (FIG. 6D) resulting in the generation of the shift signal COSFT over line 256 enabling the register 258 (FIG. 6F) to shift the next bit of the unique address over line 262 to the flip-flop 264. If the next bit is a binary zero, the flip-flop 264 will output a low signal over line 266 which results in the signal $\overline{\text{CONT}}$ on line 276 going high raising the signal $\overline{\text{CONROFF}}$ (FIG. 8 and FIG. 11A-21) on line 292 thereby turning on the receiver logic unit 96 (FIG. 5B) which listens for any transition on the channel 26 indicating the use of the channel by another processing unit.

The high signal $\overline{\text{CONROFF}}$ appearing on line 294 will enable the flip-flop 288 (FIG. 6F) to output a high signal (FIG. 11A-23) over line 296 upon the transition detect signal TRANDET (FIG. 11A-22) becoming active indicating the use of the channel 26 by another processing unit. The raising of the next TRANDET signal results in the flip-flop 290 raising the signal BUSY (FIG. 11A-17) over line 298 which stops the contention operation by resetting the logic circuits in the contention circuitry 64. Upon the signal $\overline{\text{IDLE}}$ (FIG. 9) becoming active after the elapse of 32 bit times indicating the channel 26 is available for transmission, the controller chip 30 will initiate a new contention opera- tion.

If the controller chip 30 concludes its contention phase without detecting the presence of any transition on the channel 26, the counter 302 (FIG. 6F) will output the high clear to send signal CTS (FIG. 11A and 11B-26) over line 304 which is outputted over line 218 to the flip-flop 206 (FIG. 6B) and the AND gate 180 resulting in the text required signal TEXT REQT being outputted over line 182 and through the output buffer 44 (FIG. 5A) requesting the next byte of data from the microprocessor 22. The flip-flop 206 is enabled to output the active high load shift register signal LOADSR over line 210 enabling the data stored in the input data register 38 (FIG. 6D) to be shifted over line 216 into the parallel-to-serial converter 68 (FIG. 6E) which outputs the serial frame data over line 142 to the zero insertion logic unit 70 (FIG. 5B) for insertion of a binary zero in the proper position in the message as previously described.

When the last byte of data is transmitted, the microprocessor 22 (FIG. 1) will load the end-of-message bit EOM (FIG. 11A-5) into the control register 36 (FIG. 6D) which is outputted over line 158 and gated by gates 156 and 162 (FIG. 6E) enabling the flip-flop 168 to reset the flip-flop 144. The resetting of the flip-flop 144 tells the controller chip 30 that the message is complete. The controller chip 30 will then enable the CRCC generator unit 72 (FIG. 5B) to add a CRCC character (FIG. 2) to the message for error checking; the flag generator 74 (FIG. 5B) to add the closing flag character and the postamble which is identical to the flag character. This completes the transmission of the message.

While the principles of the invention have now been made clear in an illustrated embodiment, it will be obvious to those skilled in the art that many modifications of structure, arrangements, elements and components can be made which are particularly adapted for specific environments and operating requirements without departing from those principles. The appended claims are therefore intended to cover and embrace any such modifications, within the limits only of the true spirit and scope of the invention.

We claim:

1. A data processing system wherein a plurality of stations share a communication channel by way of which transfer of data between stations takes place wherein each of the stations is assigned a binary address representing the priority of access of the station to the communication channel, an apparatus associated with each station for controlling access to the communication channel comprising:

means for outputting a plurality of binary bits in a first and second state which collectively comprise the address of its associated station, each of the said binary bits respectively correspond to individual bits in said address starting with the most significant bit of the address and ending with the least significant bit;

means for generating a plurality of time slots of fixed duration;

means for transmitting busy signals over the communications channel for the fixed duration of one of said time slots when enabled;

means for receiving the busy signals transmitted by another station over the communication channel when enabled;

means responsive to the outputting of each of said binary bits in said first state for enabling said transmitter means to output the busy signals over the communication channel for the fixed duration of said time slot, said enabling means being further responsive to the outputting of each of said binary bits in said second state for enabling said receiving means;

means for disabling said binary bit outputtting means and said enabling means in response to said receiving means receiving the busy signals over said communication channel;

and means for awarding access to the communication channel to its associated station upon completion of the outputting of the binary bits in the address of its associated station by said generating means and not receiving busy signals over said communication channel.

2. The data processing system of claim 1 in which said enabling means includes first logic circuit means enabled by a binary bit in said first state to output a first control signal for enabling said transmitting means to transmit the busy signals over said communication channel, said first logic circuit means further enabled by a binary bit in said second state to output a second control signal for enabling said receiving means, said receiving means generating a third control signal for controlling the operation of said disabling means whereby said first logic circuit means is disabled upon the generation of said third control signal.

3. The data processing system of claim 2 in which said outputting means includes a storage means connected to said first logic circuit means for serially outputting the binary bits in said first and second states of the address of the station when enabled, said processing system further includes means for generating a plurality of clock signals and said time slot generating means includes first means for counting said clock signals, said counting means adapted to output a fourth control signal upon reaching a predetermined count wherein said storage means is enabled to output one of the binary bits in said first and second states to said first logic circuit means upon the generation of said fourth control signal.

4. The data processing system of claim 3 in which the binary bit in said first state is a binary one and the binary bit in said second state is a binary zero.

5. The data processing system of claim 3 in which said awarding means includes a second counting means for counting said fourth control signals, said second counting means adapted to output a fifth control signal enabling said station to transmit data over said communication channel.

6. The data processing system of claim 5 which further includes a third counting means enabled by said third control signal for counting said clock signals, said third counting means adapted to output a sixth control signal upon reaching a predetermined count for disabling said disabling means enabling the station to gain access to the communication channel.

7. A data processing system wherein a plurality of stations share a communication channel by way of which transfer of data between stations takes place wherein each of the stations is assigned a binary address representing the priority of access to the communication channel, an interface associated with each station for controlling access to the communication channel comprising:

- register means for outputting first and second binary signals comprising the address of its associated station when enabled starting with the most significant binary signal of the address and ending with the least significant binary signal;
- means for generating a plurality of time slots of fixed duration;
- transmitter means for transmitting busy signals for each of said stations over the communication channel when enabled during the fixed duration of one of said time slots;
- receiver means for receiving busy signals transmitted by another station over the communication channel when enabled;
- first logic circuit means connected to said register means for generating a first control signal enabling said transmitter means in response to receiving said first binary signal and a second control signal enabling said receiving means in response to receiving said second binary signal;
- second logic circuit means disabling the operation of said register means and said first logic circuit means in response to said receiving means receiving busy signals over said communication channel;
- and third logic circuit means for enabling the station to transmit data over the communication channel to another station upon the completion of said register means outputting said first and second binary signals in the address and not receiving busy signals over said communication channel.

8. The data processing system of claim 7 which further includes a source of clock pulses and said time slot generating means includes a first counting means connected to said register means and said source of clock pulses for counting said clock pulses, said counting means adapted to output a third control signal upon reaching a predetermined count, said third control signal enabling said register means to output each of said first and second binary signals to said first logic circuit means.

9. The data processing system of claim 2 in which said first binary signal is a binary one and said second binary signal is a binary zero.

10. The data processing system of claim 8 in which said first logic means includes first gating means operated in response to the generation of said first and second binary signals for outputting said first control signal enabling said transmitter means to transmit the busy signals over said communication channel in response to receiving said first binary signal and said second control signal enabling said receiving means to detect any busy signals appearing on the communication channel, said receiving means generating a fourth control signal upon detecting a busy signal on said communication channel.

11. The data processing system of claim 10 in which said second logic circuit means includes a first bi-stable device connected to said first logic circuit means and enabled by the generation of said fourth control signal to output a fifth control signal for disabling the operation of said first logic circuit means whereby the interface is disabled from gaining access to the transmission channel.

12. The data processing system of claim 11 in which said third logic circuit means includes a second counting means connected to said first counting means for counting said third control signals, said second counting means adapted to output a sixth control signal upon reaching a count representing the number of binary signals in the address of the interface whereby said station is enabled to transmit data over the communication channel.

13. The data processing system of claim 12 which further includes third counting means connected to said source of clock signals and enabled by said fourth control signal to count said clock signals, said third counting means adapted to output a seventh control signal upon reaching a predetermined count whereby said bi-stable device is disabled from outputting said fifth control signal thereby enabling the interface to gain access to the transmission channel.

14. A data processing system wherein a plurality of stations share a communication channel by way of which the transfer of data between stations takes place wherein each of the stations is assigned a binary address representing the priority of access of the station to the communication channel, and integrated chip interface associated with each station for controlling access to the commumication channel comprising:

- register means for outputting a plurality of first and second binary signals comprising the address of its associated station when enabled starting with the most significant binary signal and ending with the least significant binary signal;
- means for generating a plurality of time slots of fixed duration;
- transmitter means for transmitting busy signals over the communication channel for the fixed duration of one of said time slots when enabled;
- receiver means for receiving busy signals transmitted by another station over the communication channel when enabled, said receiver means generating a first control signal upon receiving busy signals over the communication channel;
- means for generating a plurality of clock pulses;
- a first counter member connected to said clock pulse generating means for counting said clock pulses, said counter member outputting a second control signal upon reaching a predetermined count enabling said register means to output each of said first and second binary signals;
- a gating member operated by said first and second binary signals to output a third control signal enabling said transmitter means in response to the outputting of each of said first binary signals, said gating member further outputting a fourth control signal enabling said receiver means in response to the output of each of said second binary signals;
- a bi-stable device enabled by the generation of said first control signal to output a first control signal disabling the operation of said gating member and said register means;
- and a second counter member connected to said first counter member for counting said second control signal, said second counter member outputtiing a sixth control signal upon reaching a count equal to the number of binary signals in said register means, said sixth control signal enabling said station to transmit data over said communication channel.

15. The data processing system of claim 14 which further includes a third counter member connected to said clock pulse generating means and said receiving means, said third counter member enabled by said first control signal to count said clock pulses and to output a seventh control signal upon reaching a predetermined count whereby said bi-stable device is disabled from outputting said fifth control signal enabling the station to transmit data over said communication channel.

16. A method for awarding priority for access to a communication channel between a plurality of stations connected to said channel each having a unique binary address composed of binary bits in a first and a second state which represent the priority of access to the communication channel for that station wherein the channel will be in either an idle state where no stations are transmitting busy signals over the channel or a busy state where a station is transmitting busy signals over the channel, said method comprising the following sequential steps which are performed by each station desiring access to the communication channel for transmitting data signals to another station on the channel;

sensing the state of the communication channel;
generating a plurality of time slots of fixed duration;
examining each binary bit in its unique address starting with the most significant bit and ending with the least significant bit upon sensing the communication channel to be in an idle state;
transmitting busy signals over the communication channel during one of said time slots upon sensing a binary bit in said first state in the unique address putting the communication channel in a busy state for the fixed duration of said time slot;
sensing the state of the communication channel during one of said time slots in response to sensing a binary bit in said second state in the unique address;
disabling the station from gaining access to the commmunciation channel upon sensing the channel to be in a busy state;
and transmitting data signals over the communication channel in response to not sensing the communication channel to be in a busy state upon the completion of the examination of the binary bits in the unique address.

17. In a data processing system wherein a plurality of stations share a communication channel by way of which a transfer of information between stations takes place, a method for awarding access to the communication channel between contending stations in which the communication channel is in a first state where no busy signals are present on the channel and a second state where busy signals are present on the channel comprising the steps of:

assigning a unique binary address to each contending station representing the priority of access of the contending station to the communication channel comprising a plurality of binary bits in a first and second state;
generating a plurality of time slots of fixed duration;
for each contending station, sensing the state of the communication channel;
examining each binary bit in its unique binary address starting with the most significant bit and ending with the least significant bit in response to sensing the communication channel to be in the first state;
transmitting a plurality of busy signals on the communication channel during the fixed duration of one of said time slots in response to sensing each of the binary bits in said first state in its unique address putting the communication channel in said second state;
sensing the state of the communication channel during one of said time slots in response to sensing each of the binary bits in said second state in its unique address;
disabling the operating of the station from attempting to gain access to the communication channel in response to sensing the communication channel being in said second state;
and enabling the station to transmit data signals over the communication channel to a second station in response to completing the examination of the binary bits in the unique address and not sensing the communication channel to be in said second state.

18. The method of claim 17 which further includes the step of enabling a station which has been disabled from contending for access to the communication channel, to gain access to the communication channel after the elapse of a predetermined time period.

* * * * *